United States Patent [19]

Ogata

[11] 4,451,876
[45] May 29, 1984

[54] SWITCHING REGULATOR

[75] Inventor: Yasunobu Ogata, Kumagaya, Japan

[73] Assignee: Hitachi Metals, Ltd., Tokyo, Japan

[21] Appl. No.: 379,861

[22] Filed: May 19, 1982

[30] Foreign Application Priority Data

Jun. 19, 1981 [JP] Japan .................................. 56-94781
Jun. 19, 1981 [JP] Japan .................................. 56-94782
Jun. 19, 1981 [JP] Japan .................................. 56-94783

[51] Int. Cl.³ .......................................... H02M 3/335
[52] U.S. Cl. .......................................... 363/21; 363/91
[58] Field of Search .............................. 323/249, 250; 363/18–21, 91

[56] References Cited

U.S. PATENT DOCUMENTS 4,217,632 8/1980 Bardos et al. ................... 363/91 X
4,262,233 4/1981 Becker et al. ................... 363/213 X
4,375,077 2/1983 Williams .......................... 363/91

FOREIGN PATENT DOCUMENTS 1181397 2/1970 United Kingdom .

OTHER PUBLICATIONS

Hilzinger, "Amorphe Magnetwerkstoffe", *NTG-Fachberichte*, Bd. 76, (1980), pp. 283–305.
Kunz et al., "Amorphous Alloys for Switched-Mode Power Supplies", *Journal of Magnetism and Magnetic Materials*, 19 (1980), pp. 183–184.
Hilzinger et al., "Amorphous Ferromagnetic Materials-Magnetic Fundamentals, Properties and Applications", *Journal of Magnetism and Magnetic Materials*, 9 (1978), pp. 191–199.
Bretthaver et al., Induktive Bauelemente der Leistungselektronik, *Elektronik*, (3/1981), pp. 43–50.

*Primary Examiner*—William M. Shoop
*Attorney, Agent, or Firm*—Antonelli, Terry & Wands

[57] ABSTRACT

A switching regulator of the magnetic amplifier type comprises a saturable reactor whose core is made by winding a sheet of an amorphous metallic magnetic material into a toroidal form. The sheet thickness of the amorphous material is preferably between 4 μm and 60 μm so that a coercive force has a small value enough to minimize an undesirable temperature rise. The amorphous material has a composition expressed by $M_a M'_b X_c$, where M is Fe and/or Co, M' is a metallic element other than Fe and Co, M' is a nonmetallic element, a, b and c are in the conditions of $a \geq 50$, $b \leq 30$ and $c \leq 30$ respectively, and $a+b+c=100$.

6 Claims, 7 Drawing Figures

SWITCHING REGULATOR

BACKGROUND OF THE INVENTION

This invention relates to improvements in the operating characteristic of a switching regulator of the type employing a magnetic amplifier as a means for supplying a regulated voltage.

One form of such a switching regulator has a structure as shown in FIG. 1. Referring to FIG. 1, the switching regulator includes a switching element 1, a main transformer 2 having a primary winding 3 and a secondary winding 4, a saturable reactor 5, a rectifier circuit 6, a constant-voltage control circuit 7, and DC output terminals 8a and 8b.

The operation of the switching regulator circuit shown in FIG. 1 will now be described.

A DC voltage is applied across the primary winding 3 of the main transformer 2, and the switching element 1 connected to the primary winding 3 is turned on-off to induce a pulse voltage in the secondary winding 4 of the main transformer 2. This pulse voltage is applied through the saturable reactor 5 to be rectified by the rectifier circuit 6, and the resultant DC voltage appears across the output terminals 8a and 8b. A positive pulse current $i_1$ flowing through the saturable reactor 5 simultaneously causes the saturable reactor 5 to saturate at a saturation point A on the B-H curve shown in FIG. 4a, and, when the current $i_1$ is reduced to zero, the magnetization returns to a point Br. By the action of the control circuit 7, the value of a negative pulse current $i_2$ changes approximately in inversely proportional relation to the DC output setting voltage. That is, this negative pulse current $i_2$ is the control current, and, with the increase in the value of this control current, the point of resetting shifts gradually from a point B toward a point C. The impedance of the saturable reactor 5 is maximum and the voltage drop thereacross is also maximum when the operation between the points C and A is repeated at a large value of $i_2$. The switching regulator shown in FIG. 1 is thus called the magnetic amplifier type since the voltage drop across the saturable reactor 5 is changed by the control current $i_2$ to maintain constant the DC output voltage.

An important problem in the design of the switching regulator of the magnetic amplifier type is the selection of the material of the core of the saturable reactor 5. The requirements for the material are, among others, that (i) the residual magnetic flux Br in FIG. 4a is large, (ii) the coercive force Hc is small, and (iii) the thickness of the reactor is as small as possible. Up to now, the permalloy containing 50° of Nickel has been favorably employed as a typical material satisfying the above requirements. A toroidal core is provided by a spirally wound sheet of such a permalloy sheet about 25 μm thick as shown in FIG. 2. Before the permalloy sheet is wound into the toroidal shape, MgO is coated on the surface of the permalloy sheet as by cataphoresis, because the core is thereafter heat-treated at a high temperature of about 1,000°C. in the spirally-wound form. The MgO acts finally as an insulator insulating between the overlapping layers of the spirally-wound permalloy sheet, thereby reducing the eddy-current loss of the core of the saturable reactor during high-frequency operation. The core is housed within a toroidal bobbin 10 as shown in FIG. 3 so that the stress produced during winding with a winding conductor 11 may not be directly imparted to the core. According to the B-H curve 12 of the material of this kind, the coercive force Hc is Hc ≃ 0.1 Oe as seen in FIG. 4a, and the material is sufficiently practically usable up to a frequency of about several kHz. However, with the increase in the frequency up to about several tens kHz through several hundred kHz, the core loss has excessively increased, and it has been unable to prevent an excessive temperature rise of the core. Further, it has become difficult to ignore the eddycurrent loss, and the material having a very small thickness of less than 15 μm has become strongly demanded. Consequently, not only the difficulty of handling of the material during, for example, heat treatment has become marked, but also a great increase in the material cost has become inevitable.

SUMMARY OF THE INVENTION

It is a primary object of the present invention to challenge the limit of the prior art pointed out above and to provide a novel and improved switching regulator of the magnetic amplifier type which is not encountered with an appreciable temperature rise and can be easily assembled.

In accordance with the present invention which attains the above object, there is provided a switching regulator of the magnetic amplifier type comprising a switching element connected in series with the primary winding of a transformer to be periodically turned on-off, a saturable reactor connected in series with the secondary winding of the transformer, a rectifier circuit connected in series with the saturable reactor, and a control circuit controlling the control current of the saturable reactor for maintaining constant the DC output voltage appearing across the output terminals of the rectifier circuit, wherein a magnetic material of amorphous metal having its sheet thickness lying within the range of 4 μm to 60 μm is used to form the core of the saturable reactor.

The present invention exhibits a most satisfactory effect when the amorphous metallic magnetic material has a composition expressed by $M_aM'_bX_c$, where M is Fe and/or Co, M' is a metallic element other than Fe and Co, X is a nonmetallic element; a, b and c are $50 \leq a$, $30 \geq b$ and $30 \geq c$ in atomic percent respectively; and $a+b+c=100$.

DESCRIPTION OF THE PREFERRED EMBODIMENTS

Preferred embodiments of the present invention will now be described in detail.

EMBODIMENT 1

Figure 1:
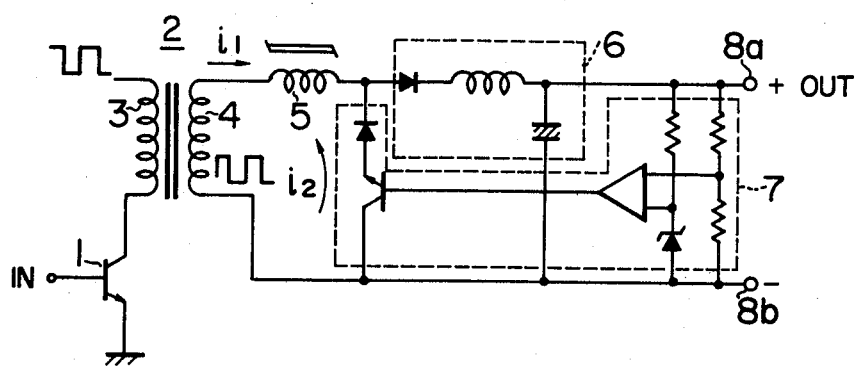
FIG. 1 is a circuit diagram of a switching regulator which is commonly known.
Figure 2:
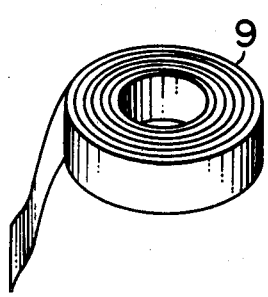
FIG. 2 is a perspective view of a known core.
Figure 3:
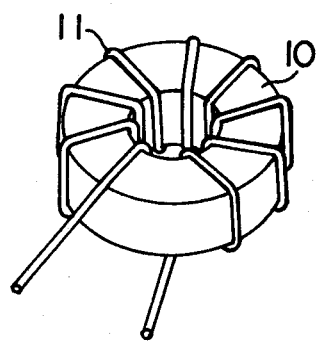
FIG. 3 is a perspective view of a known saturable reactor.
Figure 4A:
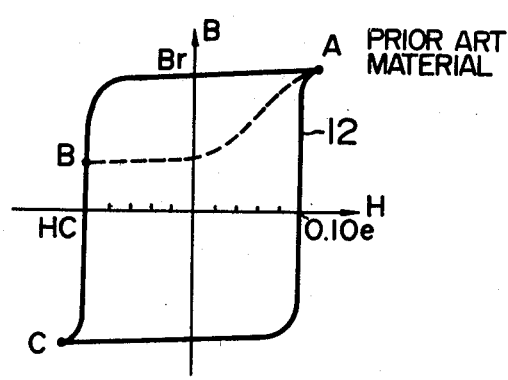
FIG. 4a shows the B-H curve of the known core material.
Figure 4B:
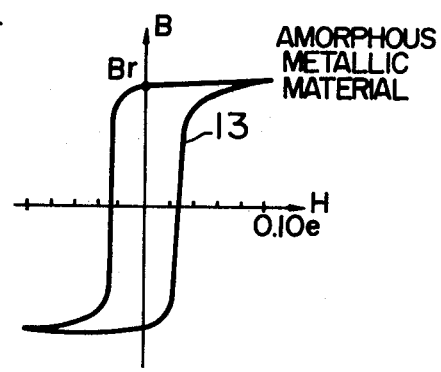
FIG. 4b shows the B-H curve of the core of the amorphous metallic magnetic material employed in the present invention.

FIG. 4b shows the B-H curve 13 of the amorphous metallic magnetic material employed in the switching regulator of the present invention. The composition of the amorphous material is a compound expressed as FeCoSiB-series, and the material has a sheet thickness of 25 μm. It will be apparent from comparison between FIG. 4a and FIG. 4b that, when the amorphous metallic magnetic material of such a thickness is used as the material of the core of the saturable reactor, its coercive force Hc is very small compared with that of the 50% Ni permalloy, so that the core loss is expected to be greatly reduced. The process for the formation of the core of the amorphous metallic magnetic material so called herein is such that a melt of the above composition is ejected onto the surface of a single roll or double rolls rotating at a high speed, and the layers are subjected to rapid cooling thereby to instantaneously obtain a spiral form as seen in FIG. 2. Although it is then necessary to subject the spiral of the amorphous magnetic material to heat treatment in the presence or absence of a magnetic field, the temperature of heat treatment is in the range of from 300° C. to 500° C. at the most and is thus very low compared with that used for the heat treatment of the 50% Ni permalloy. Therefore, the inter-layer insulator required hitherto for preventing fusion bonding of the layers of the 50% Ni permalloy is unnecessary. However, an insulator for decreasing the eddy-current loss may be interposed between the layers of the amorphous metallic magnetic material. In the case of the amorphous metallic magnetic material, the interlayer insulator is frequently unnecessary because the surface of this material is commonly slightly oxidized during the step of rapid cooling followed by solidification. Finally, like the prior art one, the core of the amorphous metallic magnetic material is enclosed in a toroidal bobbin 10 as shown in FIG. 3, and a winding conductor 11 is wound to provide the saturable reactor. The core of the material according to the present invention is not so sensitive to a stress compared with the prior art one, so that the overall assembling process including the step of enclosure of the core in the toroidal bobbin and the step of winding it with the conductor becomes very simple.

Figure 5:
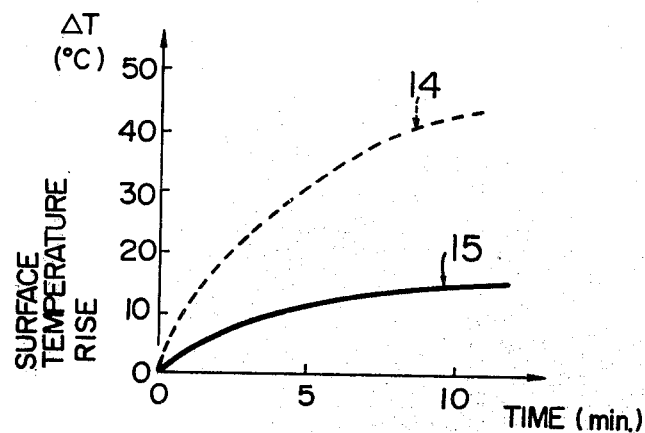
FIG. 5 is a graph showing the temperature rise versus time characteristic of the material employed in the present invention when compared with that of the known material.

FIG. 5 shows the results of a test in which the switching regulator was operated at a switching frequency of 50 kHz, and the surface temperature of the saturable reactor was measured. The dotted curve 14 in FIG. 5 represents the temperature rise at the surface of the bobbin enclosing the core of the prior art 50% Ni permalloy, and the solid curve 15 represents that of the core of the amorphous metallic magnetic material employed in the present invention. The sheet thickness was 25 μm in each case. It will be readily seen from FIG. 5 that, while the 50% Ni permalloy employed in the prior art exhibited a great surface temperature rise of more than about 40° C. in about 10 minutes, that of the amorphous metallic magnetic material employed in the present invention was only about $\frac{1}{2}$ to $\frac{1}{3}$ of the prior art value. One of the principal reasons therefore is that the coercive force Hc of the amorphous metallic magnetic material is Hc ≃ 0.02 Oe which is only about 1/5 of the prior art value, as will be seen from the B-H curve of the amorphous metallic magnetic material shown in FIG. 4b. Another principal reason is that the specific electrical resistance of the amorphous metallic magnetic material is $130 \times 10^{-6}$ [Ω-cm] which is several times as high as that of the 50% Ni permalloy, and still another principal reason is that the thin oxide film formed on the surface of the amorphous metallic material acts as a layer insulator in the wound core thereby considerably decreasing the eddy-current loss.

Figure 6:
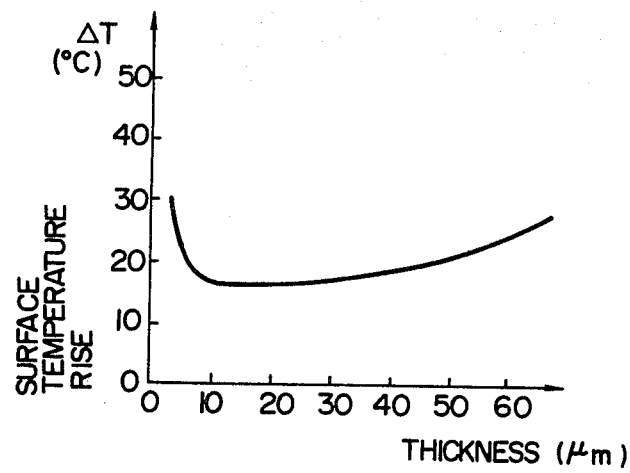
FIG. 6 is a graph showing the temperature rise versus thickness characteristic of the material employed in the switching regulator of the present invention.

FIG. 6 shows the results of measurement of the surface temperature rise of the saturable reactor when the thickness of the amorphous metallic magnetic material of the described composition was changed. It will be seen from FIG. 6 that the temperature rise increases when the thickness of the material is excessively small or large. This is because an excessively large thickness results not only in undesirable degradation of the property of the amorphous metallic magnetic material itself, but also in an increased eddy-current loss. Also, when an excessively small thickness is required, extreme difficulty is encountered for the formation of the sheet of uniform thickness, and the coercive force Hc increases sharply. From these results, it can be seen that the most suitable thickness range is between 4 μm and 60 μm when the amorphous metallic magnetic material is used to form the core of the saturable reactor.

EMBODIMENT 2

An amorphous metallic magnetic material of composition $(Co_{0.96}Fe_{0.04})_{78}Si_{13}B_9$ was used to form the core of the saturable reacotr, as in the case of EMBODIMENT 1. The coercive force Hc of this material was Hc ≃ 0.01 Oe which was about 1/10 of the prior art value, and the specific electric resistance of the material was $130 \times 10^{-6}$ [Ω-cm]. This proves that the surface temperature rise of the saturable reactor can be suppressed to less than about $\frac{1}{4}$ of the prior art one.

EMBODIMENT 3

An amorphous metallic magnetic material of composition $Fe_{70}Ni_8Si_{13}B_9$ was used to form the core of the saturable reactor, as in the case of EMBODIMENT 1. The coercive force Hc of this material was Hc ≃ 0.02 Oe which was about 1/5 of the prior art value, and the specific electric resistance of the material was $130 \times 10^{-6}$ [Ω-cm]. This proves that the surface temperature rise of the saturable reactor can be suppressed to less than about $\frac{1}{3}$ of the prior art one.

It will be understood from the foregoing description of a few preferred embodiments that, by the use of the amorphous metallic magnetic material of the present invention, the temperature rise of the saturable reactor can be greatly suppressed, so that a switching regulator of the magnetic amplifier type operable with high reliability and high efficiency can be provided.

I claim:

1. A switching regulator of a magnetic amplifier type comprising:
   a switching element connected in series with a primary winding of a transformer to be periodically turned on-off,
   a saturable reactor including a core and coil wound around said core, said core including a sheet wound in spiral form, said saturable reactor being connected in series with a secondary winding of said transformer, a rectifier circuit connected in series with said saturable reactor, and a control circuit controlling a current of said saturable reactor for maintaining constant DC output voltage appearing across output terminals of said rectifier circuit, wherein the core of said magnetic material is formed of amorphous magnetic material having its sheet thickness lying within the range of 4 μm to 60 μm, and wherein said amorphous metallic magnetic material has a composition expressed by:

$$M_a M'_b X_c$$

where
M: at least one of Fe and Co,
M': a metallic element other than Fe and Co,
X: a nonmetallic element, in the conditions of $a \geq 50$, $b \leq 30$, $3 \leq 30$, and $a+b+c=100$.

2. A switching regulator as claimed in claim 1, wherein M is Co.

3. A switching regulator as claimed in claim 1, wherein the sheet of amorphous metallic magnetic material has an oxide layer formed thereon.

4. A switching regulator as claimed in claim 3, wherein said core is formed by ejecting a melt of metallic magnetic material onto the surface of spinning rolls and subjecting the layers formed into rapid cooling, to thereby obtain a spiral form for the core, and subjecting said spiral form to a heat treatment at 300° C. to 500° C.

5. A switching regulator as claimed in claim 1, wherein said composition of the amorphous metallic magnetic materials is $(Co_{0.96}Fe_{0.04})_{78}Si_{13}B_9$.

6. A switching regulator as claimed in claim 1, wherein the thickness of said sheet is 25 μm.

* * * * *